United States Patent
Tack et al.

(10) Patent No.: US 7,067,599 B2
(45) Date of Patent: *Jun. 27, 2006

(54) FUEL OIL ADDITIVES AND COMPOSITIONS

(75) Inventors: Robert Dryden Tack, Abingdon (GB); Brid Dilworth, Oxford (GB); Dennis George Peiffer, Annandale, NJ (US)

(73) Assignee: Infineum International Ltd. (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 546 days.

(21) Appl. No.: 09/452,982

(22) Filed: Dec. 2, 1999

(65) Prior Publication Data

US 2003/0166811 A1    Sep. 4, 2003

(30) Foreign Application Priority Data

Dec. 2, 1998  (GB) ............................................ 9826448

(51) Int. Cl.
*C08F 26/06*    (2006.01)

(52) U.S. Cl. ........................ 526/258; 528/332; 528/449; 526/208; 526/209; 526/272; 525/207; 524/487

(58) Field of Classification Search ................ 526/258, 526/209, 208, 272; 525/10, 11, 207; 528/332, 528/449; 524/487
See application file for complete search history.

(56) References Cited

U.S. PATENT DOCUMENTS

| | | | |
|---|---|---|---|
| 2,542,542 A | 2/1951 | Lippincott et al. | |
| 3,536,461 A | 10/1970 | Mueller et al. | ................. 44/62 |
| 3,909,215 A | 9/1975 | Kray | |
| 4,240,916 A | 12/1980 | Rossi | ........................ 252/56 D |
| 4,416,668 A | 11/1983 | Thompson | |
| 4,482,353 A | 11/1984 | Hanlon | |
| 4,652,611 A * | 3/1987 | Kuroda et al. | ............... 525/207 |
| 4,731,095 A | 3/1988 | Garapon et al. | |
| 4,839,415 A | 6/1989 | Schurmann et al. | |
| 4,900,332 A | 2/1990 | Denis et al. | |
| 5,420,194 A * | 5/1995 | Rowe et al. | ................. 524/549 |
| 5,705,603 A * | 1/1998 | Krull et al. | .................. 528/332 |
| 6,020,061 A * | 2/2000 | Hurley et al. | ................ 428/336 |
| 6,143,043 A * | 11/2000 | Botros | ........................... 44/346 |

FOREIGN PATENT DOCUMENTS

| | | |
|---|---|---|
| EP | 0 688 796 A1 | 12/1995 |
| GB | 1197474 | 7/1970 |
| GB | 1267604 | 3/1972 |
| GB | 1268089 | 3/1972 |
| GB | 1268656 | 3/1972 |
| GB | 2129012 A | 5/1984 |
| GB | 2160536 A | 12/1985 |

* cited by examiner

*Primary Examiner*—Bernard Lipman

(57) ABSTRACT

A copolymer comprising units derivable from (A) one or more olefins of defined chain length; and (B) one or more ethylenically unsaturated compounds different from (A). The copolymers are useful as cold flow improvers in fuel oils.

9 Claims, No Drawings

FUEL OIL ADDITIVES AND COMPOSITIONS

The present invention relates to copolymers having particular structural features which are obtainable from olefins and ethylenically unsaturated compounds. In particular, the invention concerns copolymers of alpha-olefins having a particular chain length and ethylenically unsaturated compounds having a particular chain length. Such copolymers are useful as cold flow improvers in fuel oils, such as middle distillate fuel oils. The present invention also concerns additive concentrate and middle distillate fuel oil compositions comprising such copolymers and processes for preparing such copolymers.

Fuel oils, such as middle-distillate fuel oils, whether derived from petroleum or from vegetable sources, contain components, e.g., alkanes, that at low temperature tend to precipitate as large crystals or spherulites of wax in such a way as to form a gel structure which causes the fuel to lose its ability to flow. The lowest temperature at which the fuel will still flow is known as the pour point.

As the temperature of the fuel falls and approaches the pour point, difficulties arise in transporting the fuel through lines and pumps. Further, the wax crystals tend to plug fuel lines, screens, and filters at temperatures above the pour point. These problems are well recognised in the art, and various additives have been proposed, many of which are in commercial use, for depressing the pour point of fuel oils. Similarly, other additives have been proposed and are in commercial use for reducing the size and changing the shape of the wax crystals that do form. Smaller size crystals are desirable since they are less likely to clog a filter. The wax from a diesel fuel, which is primarily an alkane wax, crystallizes as platelets; certain additives inhibit this and cause the wax to adopt an acicular habit, the resulting needles being more likely pass through a filter than are platelets. The additives may also have the effect of retaining in suspension in the fuel the crystals that have formed, the resulting reduced settling also assisting in prevention of blockages.

Wax crystal modification (as measured by cold flow plugging point (CFPP) and other operability tests, as well as simulated and field performance) may be achieved by ethylene-vinyl acetate (EVAC) or propionate copolymer-based flow improvers.

It has also been proposed to use additives based on olefin/maleic anhydride copolymers. For example, U.S. Pat. No. 2,542,542 discloses copolymers of olefins such as octadecene with maleic anhydride esterified with an alcohol such as lauryl alcohol.

EP-A-320766 discloses a polymer mixture comprising a copolymer ($A_1$) made from 10–60% by weight of vinyl acetate and 40–90% by weight of ethylene, or a copolymer ($A_2$) made from 15–50% by weight of vinyl acetate, 0.5–20% by weight of $C_6$–$C_{24}$ alpha-olefin and 30–70% by weight of ethylene, and a copolymer (B) made from 10–90% by weight of $C_6$–$C_{24}$ alpha-olefin and 10–90% by weight of N—$C_6$–$C_{22}$ alkyl maleimide, the mixing ratio of copolymers ($A_1$) or ($A_2$) to (B) being 100:1 to 1:1. The side chains originating from the alpha-olefin and N-alkyl maleimide units in the copolymers exemplified in EP-A-320766 are approximately equal in length.

EP-A-688796 discloses reaction products of polyetheramines with polymers derived from dicarboxylic anhydrides and alpha-olefins.

U.S. Pat. No. 4,731,095, U.S. Pat. No. 4,900,332, FR-A-259237, U.S. Pat. No. 4,839,415, U.S. Pat. No. 4,482,353, U.S. Pat. No. 4,416,668, U.S. Pat. No. 3,909,215 and U.S. Pat. No. 3,458,295 disclose generally alpha-olefin ethylenically unsaturated dicarboxylic acid derivative copolymers, for example alpha-olefin-N-alkyl maleimide copolymers.

The present invention is based on the surprising finding that copolymers having particular structural features provide improved low temperature properties to fuel oils, especially middle-distillate fuel oils. A particular structural feature is the combination of long and short side-chains along the copolymer backbone wherein the long side-chain originates from one monomer unit, while the short side-chain originates from a different monomer unit. This balance of features provides polymers with excellent performance as low temperature flow improvers.

Accordingly, a first aspect of the present invention provides a copolymer comprising units derivable from:
 (A) either:
  (i) an olefin; or
  (ii) a mixture of olefins; and
 (B) one or more ethylenically unsaturated compounds different from (A);
wherein the units derivable from (A) carry hydrocarbyl substituents containing a continuous chain of carbon atoms, and optionally oxygen and/or nitrogen and/or sulfur atoms, the average length of the chains being at least 22 atoms; and wherein the units derivable from (B) carry hydrocarbyl substituents containing a continuous chain of carbon atoms, and optionally oxygen and/or nitrogen and/or sulfur atoms, the average length of the chains being at most 8 atoms.

In a second aspect, the present invention provides a process for the preparation of the copolymers of the first aspect, which process comprises either:
 (I) copolymerising one or more olefins with one or more ethylenically unsaturated compounds comprising a hydrocarbyl substituent containing a continuous chain of carbon atoms, and optionally oxygen and/or nitrogen and/or sulfur atoms, the average length of the chains being at most 8 atoms; or
 (II) co-polymerising one or more olefins with one or more ethylenically unsaturated compounds; and thereafter derivatising the units from the unsaturated compound such that they carry a hydrocarbyl substituent containing a continuous chain of carbon atoms, and optionally oxygen and/or nitrogen and/or sulfur atoms, the average length of the chains being at most 8 atoms;
wherein the unsaturated compound is different from the olefin and the olefin comprises a hydrocarbyl substituent containing a chain of carbon atoms, and optionally oxygen and/or nitrogen and/or sulfur atoms, the average length of the chains being at least 22 atoms.

In a third aspect, the present invention provides an additive concentrate comprising the copolymer of the first aspect, or the copolymer obtainable by the process of the second aspect, and diluent.

In a fourth aspect, the present invention provides an additive composition comprising the copolymer of the first aspect, or the copolymer obtainable by the process of the second aspect, and one or more cold flow improving fuel additives.

In a fifth aspect, the present invention provides a middle distillate fuel oil composition comprising fuel oil boiling in the range of from 100° C. to 500° C. and any of the copolymer of the first aspect, the copolymer obtainable by the process of the second aspect, the additive concentrate of the third aspect, or the additive composition of the fourth aspect.

In a sixth aspect, the present invention provides the use of the copolymer of the first aspect, or the copolymer obtainable by the process of the second aspect, to improve the low temperature filterability of middle distillate fuel oils, especially the CFPP of the oil.

In a seventh aspect, the present invention provides a storage vessel containing any of the additive concentrate of the third aspect, the additive composition of the fourth aspect, or middle distillate fuel oil composition of the fifth aspect.

Preferably, the copolymers of the first aspect are derived from (A) and (B).

(A)

Examples of (A) are selected from olefins of the general formula I below, which are suitable for use in all aspects of the present invention. For the avoidance of doubt, formula I does not represent any particular stereo-isomer arrangement.

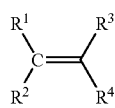

I $R^1$, $R^2$, $R^3$ and $R^4$ are, independently of each other, hydrogen or hydrocarbyl groups with the proviso that at least one of $R^1$, $R^2$, $R^3$ or $R^4$ is a hydrocarbyl substituent which contains, preferably is, a continuous chain of carbon atoms, and optionally oxygen and/or nitrogen and/or sulfur atoms, the length of the chain being at least 22 atoms.

In relation to all aspects of the present invention, the continuous chain derivable from (A) is preferably 24 or more, more preferably 28 or more, atoms. Preferably the number of atoms in the continuous chain is at most 100, such as at most 76, for example at most 50.

The term 'continuous chain', as used herein with respect to the units derivable from (A) and (B), refers to a chain of successively linked atoms in an acyclic chain, i.e., the chain contains no rings.

The hydrocarbyl substituent derivable from or of (A) may contain atoms other than carbon and hydrogen, for example, atoms such as oxygen, nitrogen and sulfur. These atoms may form part of the continuous chain or be present in the hydrocarbyl substituent separate from the continuous chain. If present as part of the chain, they represent less than 20%, preferably less than 10% of the total atoms in the chain.

Preferably the hydrocarbyl substituent contains a continuous chain of at least 22 carbon atoms. The continuous chain may have branches of hydrocarbyl radicals, such as alkyl, for example methyl groups. It is preferred that the continuous chain is non-branched, for example it is an alkylene chain, such as of the formula:

where m is at least 22, preferably 24 or more, more preferably 28 or more. Preferably m is at most 100, such as at most 76, for example at most 50. Preferably the hydrocarbyl substituent derivable from or of unit (A) is linear.

The hydrocarbyl substituent may contain other groups as well as the continuous chain, for example it may contain an aryl group. The hydrocarbyl substituent may be an alkyl group, an alkylaryl group, or OR group, where R is an alkyl group.

Preferably the hydrocarbyl substituent is an alkyl group, more preferably a linear alkyl group. If branching groups, such as alkyl groups, are present on the hydrocarbyl substitutent it is preferred that they are located near to the double bond of the olefin. Also, if an aryl group is present on the hydrocarbyl substitutent it is preferred that it is located near to the double bond of the olefin.

An example of formula I where a hydrocarbyl substituent contains an aryl group as well as the continuous chain is alkyl substituted styrene. Other examples of formula I include vinyl ethers containing a continuous chain of at least 22 carbon atoms, such as 24 or more carbon atoms.

The olefins may contain one or more double bonds; it is preferred that the olefins are mono-olefins.

Preferably, the units derivable from (A) is an alpha-olefin, that is where $R^1$ and $R^2$, referring to formula I, are hydrogen atoms and $R^3$ and $R^4$ are the same or different hydrocarbyl groups, or where $R^1$, $R^2$ and $R^3$ are hydrogen atoms and $R^4$ is a hydrocarbyl group. Especially preferred are linear alpha-olefins where $R^1$, $R^2$ and $R^3$ are hydrogen atoms and $R^4$ is an n-alkyl group.

A mixture of olefins of general formula I may also be used provided the average length of the continuous chains of the hydrocarbyl substituent is at least 22, preferably 24 or more, more preferably 28 or more, atoms. Preferably the average length of the continuous chains of the hydrocarbyl substituent number is at most 100, such as at most 76, for example at most 50, atoms.

It has been found that copolymer comprising units derivable from a mixture of olefins containing 30 or more carbon atoms or a mixture of olefins containing 24 to 28 carbon atoms are particularly effective in the present invention. Advantageously, these olefins are linear alpha-olefins.

(B)

Examples of (B) are selected from ethylenically unsaturated compounds of the general formula II below, which are suitable for use in all aspects of the present invention. For the avoidance of doubt, formula II does not represent any particular stereo-isomer arrangement.

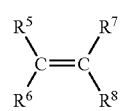

II $R^5$, $R^6$, $R^7$ and $R^8$, independently of each other, are selected from the group consisting of hydrogen, hydrocarbyl group, OH and C(O)OH, or a derivative thereof.

Advantageously, $R^5$ is a hydrogen atom; $R^7$ is an alkyl group containing 1 to 4 carbon atoms, such as methyl; and $R^6$ and $R^8$ are independently of each other OH, C(O)OH or a derivative thereof. Especially preferred are unsaturated compounds where $R^5$ and $R^7$ are hydrogen atoms; and $R^{76}$ and $R^8$ are independently of each other OH, C(O)OH or a derivative thereof.

Ethylenically unsaturated compounds useful in all aspects of the present invention include compounds where $R^5$, $R^6$ and $R^7$ are hydrogen atoms; and $R^8$ is one of OH, COOH or a derivative thereof.

Referring to formula II above, other examples of preferred unsaturated compounds are where $R^5$ and $R^7$ are hydrogen atoms; and $R^6$ and $R^8$ are COOH groups or a derivative thereof, or $R^6$ and $R^8$ together form a dicarboxylic acid anhydride group or a derivative thereof. Preferably the units derivable from (B) is maleic anhydride or a derivative thereof.

Examples of suitable ethylenically unsaturated compounds are acrylic acid, methylacrylic acid, fumaric acid, maleic acid and maleic anhydride. Also within the scope of the present invention are unsaturated compounds described in EP-A-0688796, such as itaconic anhydride and citraconic anhydride. Examples of ethylenically unsaturated compound derivatives are imides, esters, ethers, amides, and amine salts of mono- or di-carboxylic acid.

Preferably at least one of $R^5$, $R^6$, $R^7$ or $R^8$ comprises a hydrocarbyl substituent which contains, preferably is, a continuous chain of carbon atoms, and optionally oxygen and/or nitrogen and/or sulfur atoms, the length of the chain being at most 8 atoms.

In the instance where a derivative of the unsaturated compound is used, the derivative may be selected from the group consisting of ethylenically unsaturated N-hydrocarbyl imide, ethylenically unsaturated N-hydrocarbyl amide, N-hydrocarbyl amine salt of ethylenically unsaturated mono- or di-carboxylic acid, ethylenically unsaturated hydrocarbyl ester and ethylenically unsaturated hydrocarbyl ether.

In the instance where at least one of $R^5$, $R^{76}$, $R^7$ or $R^8$ is present, referring to formula II, as a derivative of OH or C(O)OH, then preferably at least one of $R^5$, $R^6$, $R^7$ or $R^8$ is selected from $OR^9$, $O(O)CR^9$, $C(O)OR^9$, $CONR^9R^{10}$ and $CO_2^{-+}NR^9R^{10}R^{11}$, or $R^6$ and $R^8$ together form the structure $C(O)NR^9(O)C$; where $R^9$ is a hydrocarbyl substituent which contains, preferably is, a continuous chain of carbon atoms, and optionally oxygen and/or nitrogen and/or sulfur atoms, the length of the chain being at most 8 atoms. $R^{10}$ and $R^{11}$, independently of each other, are hydrocarbyl groups or hydrogen; preferably $R^{10}$ and $R^{11}$ are alkyl groups which may be the same or different.

In relation to all aspects of the present invention, the length of the continuous chain derivable from (B) is preferably from 1 to 8, such as 2 to 6, atoms.

The hydrocarbyl substituent derivable from or of (B) may contain atoms other than carbon and hydrogen, for example, atoms such as oxygen, nitrogen and sulfur. These atoms may form part of the continuous chain or be present in the hydrocarbyl substituent separate from the continuous chain.

In relation to all aspects of the invention, the hydrocarbyl substituent derivable from or of (B) preferably contains a continuous chain of at most 8 carbon atoms. The continuous chain may have branches of hydrocarbyl radicals, such as alkyl, for example methyl groups. It is preferred that the continuous chain is non-branched, for example it is an alkylene chain, such as of the formula:

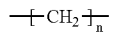

where n is at most 8, preferably from 1 to 8, more preferably from 2 to 6; such as an n-alkyl group of at most 8 carbon atoms, preferably from 1 to 8, more preferably from 2 to 6. Preferably the hydrocarbyl substituent derivable from or of (B) is linear.

The hydrocarbyl substituent derivable from or of (B) may contain one or more other groups as well as the continuous chain, for example it may contain an aryl group, morpholine group and pyrrolidinone group. If one or more other groups are present, then in relation to all aspects of the invention, the first atom of the hydrocarbyl substituent is the first atom of the continuous chain; preferably the first atom is a carbon atom.

Other examples of ethylenically unsaturated compounds may be represented by the general formula III below:

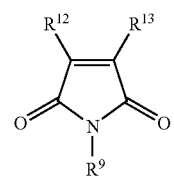

where $R^9$ is as defined above, $R^{12}$ and $R^{13}$ are independently of each other, hydrogen or alkyl groups containing 1 to 4 carbon atoms, such as methyl. Preferably $R^{12}$ and $R^{13}$ are hydrogen atoms.

Specific examples of $R^9$, referring to formulae II and III, are n-octyl, n-heptyl, n-hexyl, n-pentyl, n-butyl, n-propyl, ethyl and methyl. Other specific examples include radicals of the following general formula:

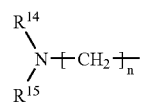

where n is at most 8, preferably from 1 to 8, such as 2 to 6; $R^{14}$ and $R^{15}$ are alkyl groups, such as methyl, or $R^{14}$ and $R^{15}$ together form alicyclic or heterocylic rings, such as a morpholine group or a pyrrolidinone group.

In all aspects of the present invention, it is preferred to use one or more amines, or one or more alcohols, or one or more carboxylic acids comprising a hydrocarbyl substituent which contains, preferably is, a continuous chain of carbon atoms and optionally oxygen and/or nitrogen and/or sulfur atoms, the length of the chain being at most 8 atoms, to derivatise the or each unsaturated compound (B), or more advantageously the or each unit derivable from the unsaturated compound (B). Compounds which derivatise the unsaturated compound or the unit derivable from the unsaturated compound are known as Reactants herein. It is preferred that derivatisation is after copolymerisation of the olefin and unsaturated compound.

The amine may be primary or secondary. Preferably the amine is a primary amine. Examples include n-octyl amine, n-hexyl amine, n-butyl amine, n-propyl amine, 4-(3-aminopropyl)morpholine and 1-(3-aminopropyl)-2-pyrrolidinone. Examples of amines described in EP-A-0688796 may also be suitable provided the amines satisfy the chain length requirements of the present invention.

Preferably the alcohol is an aliphatic alcohol, such as a linear aliphatic alcohol, or an amino alcohol of the general formula:

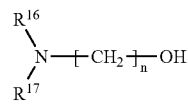

where $R^{16}$ and $R^{17}$ are alkyl groups and n is at most 8, preferably from 1 to 8, such as 2 to 6. Suitable examples include N,N-dimethylethanolamine.

N-hydrocarbyl imide compounds, such as N-hydrocarbyl maleimide compounds, satisfying the structural features of the present invention have been found to be particularly effective and are preferred as the units derivable from the ethylenically unsaturated compound (B).

As used in this specification the term "hydrocarbyl" refers to a group having a carbon atom directly attached to the rest of the molecule and having a hydrocarbon or predominantly hydrocarbon character.

Examples include hydrocarbon groups, including aliphatic (e.g. alkyl or alkenyl), alicyclic (e.g. cycloalkyl or cycloalkenyl), aromatic, and alicyclic-substituted aromatic, and aromatic-substituted aliphatic and alicyclic groups. Aliphatic groups are advantageously saturated. These groups may contain non-hydrocarbon substituents provided their presence does not alter the predominantly hydrocarbon character of the group. Examples include keto, halo, hydroxy, nitro, cyano, alkoxy and acyl. If the hydrocarbyl group is substituted, a single (mono) substituent is preferred.

Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulphur, and, preferably, oxygen.

Advantageously, the hydrocarbyl substituent derivable from or of unit B is an alkyl group containing at most 8 carbon atoms, such as 1 to 8, for example 2 to 6, such as 2 to 5, carbon atoms; preferably the alkyl group is linear.

The Copolymer

The term 'copolymer', as used herein in relation to all aspects of the invention, requires the polymer to have at least two different repeat units, i.e. be derivable from at least two different monomers, and includes polymers derivable from three or more monomers.

The copolymer may comprise units derivable from two or more different olefins and two or more different unsaturated compounds different from the olefins. For example, a copolymer may comprise units derivable from (i) C24, C26 and C28 linear alpha olefins, and (ii) N-alkyl maleimide and vinyl ester.

The copolymer, in relation to all aspects of the present invention, comprises:

(C) one or more units of general formula:

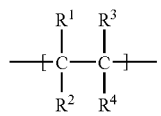

IV and (D) one or more units of general formula:

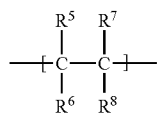

V where $R^1$, $R^2$, $R^3$ and $R^4$ are as defined in formula I above; and $R^5$, $R^6$, $R^7$ and $R^8$ are as defined in formula II above, provided that at least one of $R^5$, $R^6$, $R^7$ or $R^8$ comprises a hydrocarbyl substituent which contains, preferably is, a continuous chain of carbon atoms, and optionally oxygen and/or nitrogen and/or sulfur atoms, the length of the chain being at most 8 atoms.

Preferred examples of (C) are derivable from linear alpha olefins and preferred examples of (D) are derivable from maleic anhydride, such as N-hydrocarbyl maleimides.

The copolymers of the present invention may comprise alternating sequences of (C) and (D), or they may be present randomly. It is preferred that the copolymer comprises alternating monomer units, i.e., alternating sequences of (C) and (D).

Preferably the copolymer of the present invention comprises one or more units of general formulae:

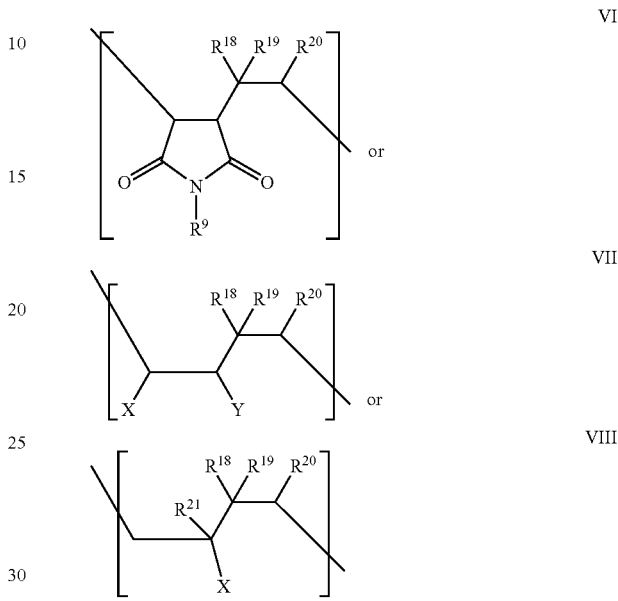

wherein $R^{18}$, $R^{19}$ and $R^{20}$, independently of one another, are hydrogen or hydrocarbyl groups, preferably the hydrocarbyl groups are alkyl groups, with the proviso that at least one of $R^{18}$, $R^{19}$ or $R^{20}$ contains, preferably is, a continuous chain of carbon atoms, and optionally oxygen and/or nitrogen and/or sulfur atoms, the length of the chain being at least 22 atoms; $R^9$ is as defined above; $R^{21}$ is either hydrogen or methyl group; X is one of $C(O)OR^9$, $C(O)NR^9R^{10}$, $CO_2^{-+}NR^9R^{10}R^{11}$ or $O(O)CR^9$; Y is X or COOH or OH; and $R^{10}$ and $R^{11}$ are as defined above.

Referring to formulae VI to VIII, it is preferred that at least one of $R^{18}$, $R^{19}$ or $R^{20}$ contains at least 24, most preferably at least 28, carbon atoms. Preferably the number of carbon atoms in the continuous chain is at most 100, such as at most 76, for example at most 50. In general, examples of $R^1$, $R^2$ or $R^3$ are alkyl, aryl, alkylaryl or OR, where $R^8$ is an alkyl group.

Referring to formulae VI, $R^{19}$ and $R^{20}$ are hydrogen atoms and $R^{18}$ contains, preferably is, a continuous chain of at least 22 carbon atoms, such as an n-alkyl group having 22 carbon atoms.

Referring to formulae VII, $R^{19}$ and $R^{20}$ are hydrogen atoms and $R^{18}$ contains, preferably is, a continuous chain of at least 22 carbon atoms, such as an n-alkyl group having 22 carbon atoms; X is one of $C(O)OR^9$, $C(O)NR^9R^{10}$ or $CO_2^{-+}NR^9R^{10}R^{11}$; and Y is one of $C(O)OR^9$, $C(O)NR^9R^{10}$, $CO_2^{-+}NR^9R^{10}R^{11}$ or COOH. Preferably X is $C(O)OR^9$ and Y is COOH.

Referring to formulae VIII, $R^{19}$, $R^{20}$ and $R^{21}$ are hydrogen atoms and $R^{18}$ contains, preferably is, a continuous chain of at least 22 carbon atoms, such as an n-alkyl group having 22 carbon atoms; and X is one of $O(O)CR^9$, $C(O)OR^9$, $C(O)NR^9R^{10}$ or $CO_2^{-+}NR^9R^{10}R^{11}$.

Copolymers of the present invention preferably have a number average molecular weight in the range of 1000 to 500,000, more preferably 2,000 to 100,000, such as 3,000 to 50,000, as measured by Gel Permeation Chromatography using polystyrene standards.

It is within the scope of the present invention that a proportion of the units derivable from the unsaturated compound in the copolymer is not derivatised, i.e. do not comprise a continuous chain of at most 8 atoms. Preferably at least 80% of the units derivable from the unsaturated compound are derivatised, more preferably at least 90% are derivatised. Advantageously, all the units derivable from the unsaturated compound are derivatised. The proportion of derivatisation may be determined by analytical techniques such as infra-red.

It has been found that copolymers comprising units derivable from alpha-olefins and ethylenically unsaturated N-hydrocarbyl imides, which satisfy the structural features of the present invention, are particularly effective as cold flow improvers; especially preferred are copolymers comprising units derivable from linear alpha-olefins and N-hydrocarbyl maleimides.

Specifically, copolymers derivable from (i) a mixture of linear alpha-olefins containing 30 or more carbon atoms, or a mixture of linear alpha-olefins containing from 24 to 28 carbon atoms, and (ii) maleic anhydride or a derivative thereof, are especially effective in the present invention.

Without wishing to be bound by any theory, it is believed that the copolymers of the present invention may function as nucleators by creating nuclei onto which wax molecules attach themselves as they come out of solution on cooling below the cloud point of the fuel oil, such as a middle distillate fuel oil.

The terminal end of the copolymer chain may be hydrogen, an olefinic group derived from the olefin or ethylenically unsaturated compound, or a hydroxy group.

Process

The copolymers of the present invention may be prepared by methods known in the art. The books "Maleic Anhydride" by B. C. Trivedi and B. M. Culbertson, Plenum Press; and "Alternating Copolymers" edited by J. M. G. Cowie, Plenum Press describe such methods.

The hydrocarbyl substituent carried by units derivable from (B), the ethylenically unsaturated compound, may be introduced into copolymers of the present invention by derivatising either (B) (pre-copolymerisation), or the units derivable from (B) (post-copolymerisation).

Preferably the copolymers of the present invention are prepared by firstly copolymerising the olefin and unsaturated compound, and then secondly derivatising the product of the copolymer so that the units derivable from the unsaturated compound(s) (B) carry a hydrocarbyl substituent which contains a continuous chain as hereinbefore defined. Reactants useful in derivatising (B) or the units derivable from (B) include amines, alcohols, carboxylic acids and alkyl halides. Preferably, amines and alcohols are used in the present invention when the unsaturated compound or the unit derivable from the unsaturated compound contains a carboxylic acid or anhydride group.

The copolymerisation of the olefin and unsaturated compound may be carried out by known, batchwise or continuous polymerisation methods, such as suspension or solution polymerisation, and initiation with suitable free radical chain initiators, for example, hydroperoxides, peroxides or azo compounds, such as dilauroyl peroxide, dibenzoyl peroxide, tert-butyl perpivalate, tert-butyl permaleate, tert-butyl perbenzoate, dicumyl peroxide, tert-butyl cumyl peroxide, di-tert-butyl peroxide, cumyl hydroperxode, tert-butyl hydroperoxide, 2,2'-azobiz (2-methylpropanonitrile), 2,2'-azobis (2-methylbutyronitrile) and mixtures with one another. In general, these initiators are used in amounts of from 0.1 to 20% by weight, preferably from 0.2 to 10% by weight, based on the monomers.

The polymerization is carried out as a rule at temperatures of 40°–400° C., preferably 80°–250° C., pressure expediently being used when olefins or solvents having boiling points below the polymerization temperature are used. The polymerization is usually carried out in the absence of air, for example under nitrogen, since oxygen interferes with the polymerization. In choosing the initiator or the initiator system, it is expedient to ensure that the half-life of the initiator or of the initiator system at the chosen polymerization temperature is less than 3 hours.

In order to obtain low molecular weight polymers, it is often expedient to work in the presence of regulators known per se. Suitable regulators are, for example, organic mercapto compounds, such as 2-mercaptoethanol, 2-mercaptopropanol, mercaptoacetic acid, mercaptopropionic acid, tert-butyl mercaptan, n-butyl mercaptan, n-octyl mercaptan, n-dodecyl mercaptan and tert-dodecyl mercaptan, which are generally used in amounts of from 0.1% by weight to 10% by weight.

Pieces of apparatus suitable for the polymerization are, for example, conventional stirred vessels having, for example, anchor stirrers, paddle stirrers, impeller stirrers or multistage impulse counter current agitators and, for the continuous preparation, stirred vessel cascades, tube reactors or static mixers.

Preferred process for the preparation of the polymers is solution polymerization. It is carried out in solvents in which the monomers and the resulting polymer are soluble. These are, for example, organic, preferably aromatic and/or aliphatic, solvents, such as cumene, toluene, xylene, ethylbenzene, decane, pentadecane or commercial solvent mixtures, such as ®Solvent Naphtha, ®ShellsolAB or ®Solvesso 150, ®Solvesso 200, ®Solvesso 250, ®EXXSOL, ®ISOPAR and ®Shellsol D types.

In the preparation, all monomers may be initially introduced and may be polymerized by adding a free radical chain initiator and with the supply of heat. Expediently, however, the solvent and some of the monomers (for example about 5–20% by weight) are initially taken and the remainder of the monomer mixture is metered in with the initiator and, if required, coninitiator and regulator.

In general, the olefin and the unsaturated compound are polymerised in essentially equimolar ratios.

During the copolymerisation step, isomerisation of the alpha-olefin may occur resulting in the migration of the double bond along the carbon chain.

The molar ratio of the Reactant to either the unsaturated compound or the unit derivable from the unsaturated compound will depend on the copolymer desired. In the instance where the copolymer desired is an olefin maleimide, the molar ratio of primary amine to maleic anhydride or the unit derivable from the maleic anhydride is essentially equimolar. The use of excess amine is also possible.

The preparation of the copolymers according to the present invention with amines is carried out at temperatures of from 50 to 250° C., preferably from 60 to 200° C. While amine salts and amides are preferably formed at temperatures below 100° C., imides are preferably formed from primary amines at higher temperatures and longer residence time with the removal of water of reaction.

Co-Additives

The copolymers of the present invention may be present in the additive composition or in the fuel oil composition in combination with one or more other additives, many of which are in use in the art or known from the literature.

The additive composition or fuel oil composition of the present may comprise one or more additional cold flow improvers described below.

For example, the concentrate or composition may contain (A) ethylene copolymer flow improvers e.g. ethylene unsaturated ester copolymer flow improvers, have a polymethylene backbone divided into segments by hydrocarbyl side chains interrupted by one or more oxygen atoms and/or carbonyl groups.

More especially, the copolymer may comprise an ethylene copolymer having, in addition to units derived from ethylene, units of the formula:

$$-CR^{30}R^{31}-CHR^{32}-$$

wherein $R^{31}$ represents hydrogen or a methyl group; $R^{30}$ represents a $-OOCR^{33}$ or $-COOR^{33}$ group wherein $R^{33}$ represents hydrogen or a $C_1$ to $C_{28}$, preferably $C_1$ to $C_{16}$, more preferably $C_1$ to $C_9$, straight or branched chain alkyl group; and $R^{32}$ represents hydrogen or a $-COOR^{33}$ or $-OOCR^{33}$ group.

These may comprise a copolymer of ethylene with one or more an ethylenically unsaturated ester, or derivatives thereof. An example is a copolymer of ethylene with an ester of an unsaturated carboxylic acid such as ethylene-acrylates (eg. ethylene-2-ethylhexylacrylate), but the ester is preferably one of an unsaturated alcohol with a saturated carboxylic acid such as described in GB-A-1,263,152. An ethylene-vinyl ester copolymer is advantageous; an ethylene-vinyl acetate, ethylene vinyl propionate, ethylene-vinyl hexanoate, ethylene-vinyl 2-ethylhexanoate, or ethylene-vinyl octanoate copolymer is preferred. Preferably, the copolymers contain from 1 to 25 such as less than 25, e.g. 1 to 20, mole % of the vinyl ester, more preferably from 3 to 15 mole % vinyl ester. They may also be in the form of mixtures of two copolymers such as those described in U.S. Pat. No. 3,961,916 and EP-A-113,581. Preferably, number average molecular weight, as measured by vapour phase osmometry, of the copolymer is 1,000 to 10,000, more preferably 1,000 to 5,000. If desired, the copolymers may be derived from additional comonomers, e.g. they may be terpolymers or tetrapolymers or higher polymers, for example where the additional comonomer is isobutylene or diisobutylene or another ester, such as vinyl 2-ethyl hexanoate, giving rise to different units of the above formula and wherein the above-mentioned mole %'s of ester relate to total ester.

Also, the copolymers may include small proportions of chain transfer agents and/or molecular weight modifiers (e.g. acetaldehyde or propionaldehyde) that may be used in the polymerisation process to make the copolymer.

The copolymers may be made by direct polymerisation of comonomers. Such copolymers may also be made by transesterification, or by hydrolysis and re-esterification, of an ethylene unsaturated ester copolymer to give a different ethylene unsaturated ester copolymer. For example, ethylene vinyl hexanoate and ethylene vinyl octanoate copolymers may be made in this way, eg. from an ethylene vinyl acetate copolymer.

The copolymers may, for example, have 15 or fewer, preferably 10 or fewer, more preferably 6 or fewer, most preferably 2 to 5, methyl terminating side branches per 100 methylene groups, as measured by nuclear magnetic resonance, other than methyl groups on a comonomer ester and other than terminal methyl groups.

The copolymers may have a polydispersity of 1 to 6 preferably 2 to 4, polydispersity being the ratio of weight average molecular wright to number average molecular wright both as measured by Gel Permeation Chromatography using polystyrene standards.

Comb polymers (B) are polymers in which branches containing hydrocarbyl groups are pendant from a polymer backbone, and are discussed in "Comb-Like Polymers. Structure and Properties", N. A. Platd and V. P. Shibaev, J. Poly. Sci. Macromolecular Revs., 8, p 117 to 253 (1974).

Generally, comb polymers have one or more long chain hydrocarbyl branches, e.g., oxyhydrocarbyl branches, normally having from 10 to 30 carbon atoms, pendant from a polymer backbone, said branches being bonded directly or indirectly to the backbone. Examples of indirect bonding include bonding via interposed atoms or groups, which bonding can include covalent and/or electrovalent bonding such as in a salt.

Advantageously, the comb polymer is a homopolymer or a copolymer having, at least 25 and preferably at least 40, more preferably at least 50, molar percent of the units of which have, side chains containing at least 6, and preferably at least 10, carbon atoms.

As examples of preferred comb polymers there may be mentioned those of the general formula:

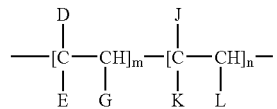

wherein
D=$R^{34}$, COOR$^{34}$, OCOR$^{34}$, $R^{35}$COOR$^{34}$, or OR$^{34}$,
E=H, CH$_3$, D, or $R^{35}$,
G=H or D
J=H, $R^{35}$, $R^{35}$COOR$^{34}$, or an aryl or heterocyclic group,
K=H, COOR$^{35}$, OCOR$^{35}$, OR$^{35}$ or COOH,
L=H, $R^{35}$, COOR$^{35}$, OCOR$^{35}$, COOH, or aryl,
$R^{34} \geq C_{10}$ hydrocarbyl,
$R_{35} \geq C_1$ hydrocarbyl or hydrocarbylene,
and m and n represent mole fractions, m being finite and preferably within the range of from 1.0 to 0.4, n being less than 1 and preferably in the range of from 0 to 0.6. $R^{34}$ advantageously represents a hydrocarbyl group with from 10 to 30 carbon atoms, while $R^{35}$ advantageously represents a hydrocarbyl or hydrocarbylene group with from 1 to 30 carbon atoms.

The comb polymer may contain units derived from other monomers if desired or required.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the C14 ester with the mixed $C_{14}/C_{16}$ ester may advantageously be used. In such mixtures, the ratio of $C_{14}$ to $C_{14}/C_{16}$ is advantageously in the range of from 1:1 to 4:1, preferably 2:1 to 7:2, and most preferably about 3:1, by weight. The particularly preferred comb polymers are those having a number average molecular weight, as measured by vapour phase osmometry, of 1,000 to 100,000, more especially 1,000 to 30,000.

Other suitable comb polymers are the polymers and copolymers of α-olefins and esterified copolymers of styrene and maleic anhydride, and esterified copolymers of styrene and fumaric acid; mixtures of two or more comb polymers may be used in accordance with the invention and, as indicated above, such use may be advantageous. Other examples of comb polymers are hydrocarbon polymers, e.g., copolymers of ethylene and at least one α-olefin, the α-olefin preferably having at most 20 carbon atoms, examples being n-decene-1 and n-dodecene-1. Preferably, the number average molecular weight of such a copolymer is at least 30,000 measured by GPC. The hydrocarbon copolymers may be prepared by methods known in the art, for example using a Ziegler type catalyst.

Examples of other additives which may be used in combination with the copolymers of the present invention are:

(C) Polar nitrogen compounds: Such compounds are oil-soluble polar nitrogen compounds carrying one or more, preferably two or more, substituents of the formula >NR$^{36}$, where R$^{36}$ represents a hydrocarbyl group containing 8 to 40 atoms, which substituent or one or more of which substituents may be in the form of a cation derived therefrom. The oil soluble polar nitrogen compound is generally one capable of acting as a wax crystal growth inhibitor in fuels.

An amine salt and/or amide formed by reacting at least one molar proportion of a hydrocarbyl-substituted amine with a molar proportion of a hydrocarbyl acid having from 1 to 4 carboxylic acid groups or its anhydride, the substituent(s) of formula >NR$^{36}$ being of the formula —NR$^{36}$R$^{37}$ where R$^{36}$ is defined as above and R$^{37}$ represents hydrogen or R$^{36}$, provided that R$^{36}$ and R$^{37}$ may be the same or different, said substituents constituting part of the amine salt and/or amide groups of the compound.

Examples of suitable carboxylic acids and their anhydrides for preparing the nitrogen compounds include ethylenediamine tetraacetic acid, and carboxylic acids based on cyclic skeletons, e.g., cyclohexane-1,2-dicarboxylic acid, cyclohexene-1,2-dicarboxylic acid, cyclopentane-1,2-dicarboxylic acid and naphthalene dicarboxylic acid, and 1,4-dicarboxylic acids including dialkyl spirobislactones. Generally, these acids have about 5 to 13 carbon atoms in the cyclic moiety. Preferred acids useful in the present invention are benzene dicarboxylic acids e.g., phthalic acid, isophthalic acid, and terephthalic acid. Phthalic acid and its anhydride are particularly preferred. The particularly preferred compound is the amide-amine salt formed by reacting 1 molar portion of phthalic anhydride with 2 molar portions of dihydrogenated tallow amine. Another preferred compound is the diamide formed by dehydrating this amide-amine salt.

Other examples are long chain alkyl or alkylene substituted dicarboxylic acid derivatives such as amine salts of monoamides of substituted succinic acids, examples of which are known in the art and described in U.S. Pat. No. 4,147,520, for example. Suitable amines may be those described above.

Other examples are condensates, for example, those described in EP-A-327427.

(D) A compound containing a cyclic ring system carrying at least two substituents of the general formula below on the ring system

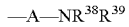

where A is a linear or branched chain aliphatic hydrocarbylene group optionally interrupted by one or more hetero atoms, and R$^{38}$ and R$^{39}$ are the same or different and each is independently a hydrocarbyl group containing 9 to 40 atoms optionally interrupted by one or more hetero atoms, the substituents being the same or different and the compound optionally being in the form of a salt thereof. Advantageously, A has from 1 to 20 carbon atoms and is preferably a methylene or polymethylene group. Such compounds are described in WO 93/04148.

(E) A hydrocarbon polymer: Examples of suitable hydrocarbon polymers are those of the general formula:

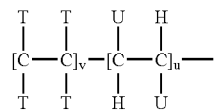

wherein T=H or R$^{40}$, where R$^{40}$=C$_1$ to C$_{40}$ hydrocarbyl; U=H, T, or aryl; and v and w represent mole fractions, v being within the range of from 1.0 to 0.0, w being in the range of from 0.0 to 1.0.

The hydrocarbon polymers may be made directly from monoethylenically unsaturated monomers or indirectly by hydrogenating polymers from polyunsaturated monomers, e.g., isoprene and butadiene.

Examples of hydrocarbon polymers are disclosed in WO 91/11488.

(F) A polyoxyalkylene compound: Examples are polyoxyalkylene esters, ethers, ester/ethers and nixtures thereof, particularly those containing at least one, preferably at least two, C$_{10}$ to C$_{30}$ linear alkyl groups and a polyoxyalkylene glycol group of molecular weight up to 5,000, preferably 200 to 5,000, the alkyl group in said polyoxyalkylene glycol containing from 1 to 4 carbon atoms. These materials form the subject of EP-A-0 061 895. Other such additives are described in U.S. Pat. No. 4,491,455.

The preferred esters, ethers or ester/ethers are those of the general formula

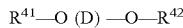

where R$^{41}$ and R$^{42}$ may be the same or different and represent:

(a) n-alkyl-
(b) n-alkyl-CO—
(c) n-alkyl-O—CO(CH$_2$)$_x$— or
(d) n-alkyl-O—CO(CH$_2$)$_x$—CO— x being, for example, 1 to 30, the alkyl group being linear and containing from 10 to 30 carbon atoms, and D representing the polyalkylene segment of the glycol in which the alkylene group has 1 to 4 carbon atoms, such as a polyoxymethylene, polyoxyethylene or polyoxytrimethylene moiety which is substantially linear; some degree of branching with lower alkyl side chains (such as in polyoxypropylene glycol) may be present but it is preferred that the glycol is substantially linear. D may also contain nitrogen.

Multicomponent additive systems may be used and the ratios of additives to be used will depend on the fuel to be treated.

The additional flow improver is advantageously employed in a proportion within the range of from 0.0001% to 1% (active ingredient), advantageously 0.001% to 0.5%, and preferably from 0.001% to 0.2%, such as 0.005% to 0.05%, by weight, based on the weight of fuel. The copolymer of the invention may also be used in combination with one or more other co-additives such as known in the art, for example the following: detergents, particulate emission reducers, storage stabilizers, antioxidants, corrosion inhibitors, dehazers, demulsifiers, antifoaming agents, cetane improvers, cosolvents, package compatibilizers, and lubricity additives.

The concentration of the copolymer in the fuel oil may, for example, be in the range of 1 to 5,000 ppm (active ingredient) by weight per weight of fuel, for example 10 to 5,000 ppm, such as 10 to 2,000 ppm by weight per weight of fuel, preferably 25 to 500 ppm, more preferably 100 to 200 ppm.

In the low wax fuel, i.e less than 3 wt % of wax at 10° C. below WAT, to which the present invention is especially applicable the proportion is advantageously from 10 to 2000 ppm, preferably from 100 to 350 ppm, by weight, based on the weight of the fuel oil.

The copolymers of the present invention should be soluble in the oil to the extent of at least 1000 ppm by weight per weight of fuel oil at ambient temperature. However, at least some of the copolymer may come out of solution near the cloud point of the fuel oil in order to modify the wax crystals that form.

Fuel Oil

The fuel oil e.g. a hydrocarbon fuel such as a petroleum-based fuel oil for example kerosene or distillate fuel oil, suitably a middle distillate fuel oil, i.e. a fuel oil obtained in refining crude oil as the fraction between the lighter kerosene and jet fuels fraction and the heavier fuel oil fraction. Such distillate fuel oils generally boil within the range of about 100° C. to about 500° C., e.g. 150° to about 400° C., for example, those having a relatively high Final Boiling Point above 360° C. Middle distillates contain a spread of hydrocarbons boiling over a temperature range, including n-alkanes which precipitate as wax as the fuel cools. They may be characterised by the temperatures at which various %'s of fuel have vaporised, e.g. 10% to 90%, being the interim temperatures at which a certain volume % of initial fuel has distilled. The difference between say 90% and 20% distillation temperature may be significant. They are also characterised by pour, cloud and CFPP points, as well as their initial boiling point (IBP) and final boiling point (FBP). The fuel oil can comprise atmospheric distillate or vacuum distillate, or cracked gas oil or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oils or of both.

Heating oils may be made of a blend of virgin distillate, e.g. gas oil, naphtha, etc and cracked distillates, e.g. catalytic cycle shock. A representative specification for a diesel fuel includes a minimum flash point of 38° C. and a 90% distillation point between 282 and 380° C. (see ASTM Designations D-396 and D-975).

Also, the fuel oil may have a sulphur concentration of 0.2% by weight or less based on the weight of the fuel. Preferably, the sulphur concentration is 0.05% by weight or less, more preferably 0.01% by weight or less. The art describes methods for reducing the sulphur concentration of hydrocarbon middle distillate fuels, such methods including solvent extraction, sulphuric acid treatment, and hydrodesulphurisation.

The fuel oil may also comprise an animal or vegetable oil or oxygenated compounds like methanol, ethanol or ethers. Preferably the fuel oil is a middle distillate fuel oil, more preferably a diesel fuel or heating oil.

The middle distillate fuels oils may have a wax content of at most 10 wt %, preferably at most 5 wt %, more preferably less 3 wt %, such as at most 2.5 wt %, 10° C. below WAT (wax appearance temperature).

Additive Concentrate and Composition

Concentrates comprising the copolymer in admixture with a carrier liquid (e.g. as a solution or a dispersion), also known as additive concentrates, are convenient as a means for incorporating the copolymer into bulk oil such as distillate fuel, which incorporation may be done by methods known in the art. The concentrates may also contain other copolymers or additives, known as additive compositions, and preferably contain from 3 to 75 wt % (active ingredient), more preferably 3 to 60 wt %, most preferably 10 to 50 wt % of the additives preferably in solution in carrier liquid. Examples of carrier liquid are organic solvents including hydrocarbon solvents, for example petroleum fractions such as naphtha, kerosene, diesel and heater oil; aromatic hydrocarbons such as aromatic fractions, e.g. those sold under the 'SOLVESSO' tradename; and paraffinic hydrocarbons such as hexane and pentane and isoparaffins. The carrier liquid must, of course, be selected having regard to its compatibility with the additive and with the fuel.

The additives of the invention may be incorporated into bulk oil by other methods such as those known in the art. If co-additives are required, they may be incorporated into the bulk oil at the same time as the additives of the invention or at a different time.

A copolymer of the present invention when used in additive compositions or fuel oil compositions may interact or react with one or more other co-additives present to form reaction products of such interactions. The scope of the present invention includes such reaction products.

A further aspect of the present invention is an internal combustion engine containing the middle distillate fuel oil composition of the present invention.

The following examples, in which all parts and percentages are by weight, and number average molecular weights (Mn) are measured by gel permeation chromatography with polystyrene as standard, illustrate the invention.

EXAMPLES

Copolymer Examples

The Copolymer Examples 1 to 10 and Comparative Copolymer Examples A to D were prepared according to the procedure described below:

In a 250 ml flask equipped with an air-driven stirrer, shaft and blade, thermometer, condenser and nitrogen blanket, 20 g of linear alpha olefin-maleic anhydride copolymer were dissolved (see Table 1) in 40 ml of toluene. The reaction mixture was heated to 60° C., and amine (10 mol % excess based on maleic anhydride in the copolymer) added by pipette and the temperature raised to 120° C. The reaction mixture was refluxed and water of reaction removed for 16–20 hours. The product of the reaction was isolated by precipation from methanol and dried under vacuum at 60° C.

Copolymer Examples 11 and 12

A similar method to that described for Copolymer Examples 1 to 11, but N,N-dimethylethanolamine was used as the amine source in a 10 mol % excess based on maleic anhydride in the copolymer (see Table 1 for the alpha olefin-maleic anhydride copolymer used).

TABLE 1

| Ex | Olefin - Maleic Anhydride Copolymer[a] | Reactant[b] | No. of Carbon atoms[c] unit (B) | unit (A) |
|---|---|---|---|---|
| A | C14 - Maleic anhydride | n-octylamine | 8 | 12 |
| B | C14 - Maleic anhydride | n-octadecylamine | 18 | 12 |
| C | C24–28[d] - Maleic anhydride | n-octadecylamine | 18 | 22–26 |
| D | C30+[e] - Maleic anhydride | n-octadecylamine | 18 | 28+ |
| 1 | C24–28 - Maleic anhydride | n-propylamine | 3 | 22–26 |
| 2 | C24–28 - Maleic anhydride | n-butylamine | 4 | 22–26 |
| 3 | C24–28 - Maleic anhydride | n-octylamine | 8 | 22–26 |
| 4 | C24–28 - Maleic anhydride | X | 3 | 22–26 |
| 5 | C24–28 - Maleic anhydride | Y | 3 | 22–26 |
| 6 | C30+ - Maleic anhydride | n-propylamine | 3 | 28+ |
| 7 | C30+ - Maleic anhydride | n-butylamine | 4 | 28+ |
| 8 | C30+ - Maleic anhydride | n-octylamine | 8 | 28+ |
| 9 | C30+ - Maleic anhydride | X | 3 | 28+ |
| 10 | C30+ - Maleic anhydride | Y | 3 | 28+ |
| 11 | C24–28 - Maleic anhydride | Z | 2 | 22–26 |
| 12 | C30+ - Maleic anhydride | Z | 2 | 28+ |

[a] the three linear alpha olefin-maleic anhydride copolymers in Table 1 were synthesised by free radical polymerisation and obtained from Petro-lite Corporation;
[b] X is 4-(3-aminopropyl)morpholine; Y is 1-(3-aminopropyl)-2-pyrrolidinone; and Z is N,N-dimethylethanolamine;
[c] number of atoms in a continuous chain from unit (A) and unit (B);
[d] a mixture of linear alpha-olefins containing 24 to 28 carbon atoms; and
[e] a mixture of linear alpha-olefins containing 30 or more carbon atoms.

The nitrogen content of selected Copolymer Examples is shown in Table 2.

TABLE 2

| Ex | Olefin - Maleic Anhydride Copolymer[1] | Nitrogen, %[1] |
|---|---|---|
| A | C14 - Maleic anhydride | 3.04 |
| B | C14 - Maleic anhydride | 2.71 |
| C | C24–28 - Maleic anhydride | 2.07 |
| D | C30 - Maleic anhydride | 1.95 |
| 3 | C24–28 - Maleic anhydride | 2.36 |
| 8 | C30 - Maleic anhydride | 2.01 |

[1] Measured by Kjeldahl method.

The copolymers were tested in the Cold Filter Plugging Point test (CFPP). The test which is carried out by the procedure described in detail according to IP 309/96 or CEN Method No. 116, is designed to correlate with the cold flow of a middle distillate in automotive diesels.

In brief, a sample of the oil to be tested (40 ml) is cooled in a bath which is maintained at about −34° C. to give non-linear cooling at about 1° C./min. Periodically (at each one degree centigrade starting from above the cloud point), the cooled oil is tested for its ability to flow through a fine screen in a prescribed time period using a test device which is a pipette to whose lower end is attached an inverted funnel which is positioned below the surface of the oil to be tested. Stretched across the mouth of the funnel is a 350 mesh screen having an area defined by a 12 millimeter diameter. The periodic tests are each initiated by applying a vacuum to the upper end of the pipette whereby oil is drawn through the screen up into the pipette to a mark indicating 20 ml of oil. After each successful passage, the oil is returned immediately to the CFPP tube. The test is repeated with each one degree drop in temperature until the oil fails to fill the pipette within 60 seconds, the temperature at which failure occurs being reported as the CFPP temperature.

The copolymers were tested alone in the fuel oil and in combination with co-additive X, which is described below.

Co-Additive X

An amide amine salt compound formed by reacting 1 molar portion of phthalic anhydride with 2 molar portions of dihydrogenated tallow amine.

The results of the CFPP tests are shown in Table 4. Table 4 shows the CFPP data of the copolymers alone in the fuel oil, and also shows the CFPP data of the binary mixture of the copolymer and co-additive X in a weight ratio of 1:3.

As fuels can differ somewhat in their response to a particular polymer at any given treat rate (a fact well known to the skilled person in this field), summed comparisons over a multiplicity of treat rates provide a useful guide to assessment of the potency of a particular polymer. Thus, the summed CFPPs of the Copolymer Examples of the invention (Examples 1 to 12) show an improvement over the Comparative Copolymer Examples A to D (see Table 4).

The properties of the fuel oil are given in Table 3.

TABLE 3

| | | Fuel |
|---|---|---|
| Density | kg/m$^{-3}$ | 851.8 |
| Cloud Point | ° C. | −5 |
| CFPP | ° C. | −6 |
| WAT | ° C. | −8.83 |
| % Wax @ 5 below WAT | % | 1.5 |
| % Wax @ 10 below WAT | % | 2.97 |
| Distillation (D86) | | |
| IBP | ° C. | 261.1 |
| 10 | | 262.8 |
| 20 | | 267.1 |
| 30 | | 270.8 |
| 40 | | 274.1 |
| 50 | | 283.1 |
| 60 | | 290.1 |
| 70 | | 299.8 |
| 80 | | 313.6 |
| 90 | | 333.7 |
| 95 | | 347.9 |
| FBP | | 363.2 |
| FBP-90 | | 29.5 |
| 90-20 | | 62.9 |

TABLE 4

| | ALONE | | | | COPOLYMER + CO-ADDITIVE X | | | |
|---|---|---|---|---|---|---|---|---|
| | CFPP, ° C. @ treat rates, ppm | | | | CFPP, ° C. @ treat rates, ppm | | | |
| Example | 200 | 400 | 600 | Sum | 200 | 400 | 600 | Sum |
| A | −7 | −6.5 | −8.5 | −22 | −6 | −7.5 | −11 | −24.5 |
| B | −7 | −5.5 | −5 | −17.5 | −5.5 | −6 | −6 | −17.5 |
| C | −7 | −7 | −6 | −20 | −7 | −7.5 | −10.5 | −25 |
| D | −8 | −9 | −8.5 | −25.5 | −7.5 | −10 | −12.5 | −30 |
| 1 | −9 | −8 | −10 | −27 | −10 | −16 | −17 | −43 |
| 2 | −8 | −9 | −10 | −27 | −9 | −16 | −17 | −42 |
| 3 | −10 | −10 | −11 | −31 | −8.5 | −15.5 | −17 | −41 |
| 4 | −9 | −9 | −10 | −28 | −9 | −16 | −18 | −43 |
| 5 | −9 | −8 | −9 | −26 | −9 | −18 | −17 | −44 |
| 6 | −9 | −10 | −10 | −29 | −9 | −16 | −17 | −42 |
| 7 | −10 | −8 | −10 | −28 | −9 | −15 | −19 | −43 |
| 8 | −10.5 | −9.5 | −9.5 | −29.5 | −10 | −18 | −19 | −47 |
| 9 | −10 | −10 | −10 | −30 | −11 | −18 | −16 | −45 |
| 10 | −8 | −8 | −10 | −28 | −9 | −15 | −15 | −39 |
| 11 | −9 | −8 | −9 | −26 | −9 | −17 | −19 | −45 |
| 12 | −12 | −10 | −9 | −31 | −10 | −17 | −18 | −45 |

What is claimed is:

1. A middle distillate fuel oil composition comprising fuel oil boiling in the range of from 100° C. to 500° C. and a copolymer comprising:
    (A) either:
        (i) an olefin; or
        (ii) a mixture of olefins; and
    (B) an ethylenically unsaturated compound selected from the group consisting of acrylic acid, methylacrylic acid, fumaric acid, maleic acid and maleic anhydride;
wherein the olefin or mixture of olefins carry hydrocarbyl substituents containing a continuous chain of carbon atoms, and optionally oxygen and/or nitrogen and/or sulfur atoms; the average length of the chains being at least 22 atoms; and wherein the copolymer is derivatized with an amine selected from the group consisting of n-octyl amine, n-hexyl amine, n-butyl amine and n-propyl amine, said derivatization being carried out after preparation of the copolymer.

2. The composition of claim 1 wherein the continuous chain is an alkylene chain.

3. The composition of claim 1 wherein (A) is an alpha-olefin.

4. The composition of claim 3 the alpha-olefin is linear.

5. The composition of claim 1 wherein the continuous chain is an alkylene chain.

6. The composition of claim 1 wherein (A) is a mixture of linear alpha-olefins containing 30 or more carbon atoms, or a mixture of linear alpha-olefins containing from 24 to 28 carbon atoms.

7. The composition of claim 1 further comprising another fuel additive selected from the group consisting of:
    (a) polyoxyalkylene esters, ethers, ester/ethers or mixtures thereof;
    (b) ethylene unsaturated ester copolymers and/or terpolymers;
    (c) polar nitrogen containing compounds;
    (d) sulfur carboxy compounds; and
    (e) hydrocarbon polymers.

8. The middle distillate fuel oil composition of claim 1 wherein the copolymer is present in an amount of from 1 to 5000 ppm based on the weight of the composition.

9. The middle distillate fuel oil composition of claim 1 wherein the fuel oil contains up to 10 wt. % wax at 10° C. below wax appearance temperature.

* * * * *

UNITED STATES PATENT AND TRADEMARK OFFICE
CERTIFICATE OF CORRECTION

PATENT NO.         : 7,067,599 B2  
APPLICATION NO. : 09/452982  
DATED                : June 27, 2006  
INVENTOR(S)       : Robert D. Tack et al.

It is certified that error appears in the above-identified patent and that said Letters Patent is hereby corrected as shown below:

Column 19, line 23, after "claim 3" insert -- wherein --.

Signed and Sealed this

Twenty-first Day of November, 2006

JON W. DUDAS  
*Director of the United States Patent and Trademark Office*